United States Patent [19]

Ueda

[11] Patent Number: 4,786,571

[45] Date of Patent: Nov. 22, 1988

[54] PHOTOSENSITIVE MEMBER WITH HYDRAZONE CHARGE TRANSPORT MATERIAL

[75] Inventor: Hideaki Ueda, Kawanishi, Japan

[73] Assignee: Minolta Camera Kabushiki Kaisha, Osaka, Japan

[21] Appl. No.: 51,646

[22] Filed: May 20, 1987

[30] Foreign Application Priority Data

May 20, 1986 [JP] Japan .................. 61-115915

[51] Int. Cl.$^4$ .................... G03G 5/09; G03G 5/14
[52] U.S. Cl. ........................... 430/59; 430/81; 430/83; 430/95; 430/96
[58] Field of Search .............. 430/59, 81, 83, 90, 430/95, 96

[56] References Cited

FOREIGN PATENT DOCUMENTS

| 57-82844 | 5/1982 | Japan | 430/59 |
| 59-182458 | 10/1984 | Japan | 430/59 |
| 60-254047 | 12/1985 | Japan | 430/59 |

Primary Examiner—Roland E. Martin
Attorney, Agent, or Firm—Burns, Doane, Swecker & Mathis

[57] ABSTRACT

The present invention relates to a photosensitive member containing a specific hydrazone compound for a charge transporting agent, which is improved in sensitivity, chargeability, resistivity over repeated use and stability.

7 Claims, 1 Drawing Sheet

PHOTOSENSITIVE MEMBER WITH HYDRAZONE CHARGE TRANSPORT MATERIAL

BACKGROUND OF THE INVENTION

The present invention relates to a photosensitive member containing a low molecular weight organic compound.

A generally known direct method of electrophotography comprises; formation of an electrostatic latent image on the surface of the photosensitive layer of a photosensitive member by electrification and exposure; making said image visible by development with a developer; formation of copied images from said visible image directly from the photosensitive member, or by a toner image transfer method, which comprises transferring the visible image on the photosensitive member onto a transfer paper such as that of an ordinary paper and the copy by fixing the transferred image, or by a latent image transfer method which comprises transferring an electrostatic latent image from a photosensitive member onto a transfer paper and developing and fixing said electrostatic latent image on said transfer paper.

The photoconductive material forming the photosensitive layer of a photosensitive member in the area of electrophotography dealt with herein, conventionally use inorganic photoconductive material such as selenium, cadmium sulfide or zinc oxide. Such photoconductive materials have advantages in that they may be charged to an appropriate potential in the dark, the loss of electrical charge in the dark is limited, the electric charge can be dissipated fast with irradiation of light, and so on. However, they do have disadvantages. For example, a selenium photosensitive member has a high production cost, and its inadequate resistivity to heat and mechanical impact necessitates caution in handling. Photosensitive members based on cadmium sulfide or zinc oxide do not have stable sensitivity in a highly humid environments and, moreover, colorant added as a sensitizer undergoes electrification deterioration due to corona charge and color fading due to exposure to light, they are lacking in stability of properties in long periods of use.

Consideration has also been given to the use of various organic photoconductive polymers, including polyvinyl carbazole. Although such polymers have advantages over the above inorganic photoconductive materials in film forming properties, lightness in weight, etc., they are inferior to the inorganic products comprising sensitivity, durability and stability to change of environmental conditions.

An organic photoconductive compound of a low molecular weight also has an advantage in that the property of the film formed, and the electrophotographic property, can be controlled by using the right kind and the right composition ratio of binder used in combination. However, combination with a binder requires the organic compound to have high compatibility with binder.

A photosensitive member consisting of an organic photoconductive compound of high or low molecular weight dispersed in a resin binder has disadvantageously large residual potentials and low sensitivity, because of many traps for the carrier. To solve this problem it has been proposed to incorporate a charge transporting material into an organic photoconductive compound.

Many organic compounds have been named for use as charge transporting materials, but this practice brings many problems to the fore. For example, U.S. Pat. No. 3,189,447 described the use of 2,5-bis(P-diethylaminophenyl)-1,3,4,-oxadiazole, however its compatibility with binders is low and the material tends to separate into crystals. The U.S. Pat. No. 3,820,989 described the use of a diarylalkane derivative, which has satisfactory compatibility with binders but repeated use causes change in sensitivity. The hydrazone compound in the Japanese Patent KOKAI No. 59143/1979 is fairly satisfactory with respect to residual potential, but shows defects with respect to sensitivity, chargeability and the properties affected by repeated use.

It has thus been almost impracticable to introduce a low molecular weight organic compound as a component of a photosensitive member to bring about satisfactory effects.

SUMMARY OF THE INVENTION

The present invention relates to a photosensitive member for electrophotography, which contains an specific hydrazone compound represented by the following formula as a charge transporting material.

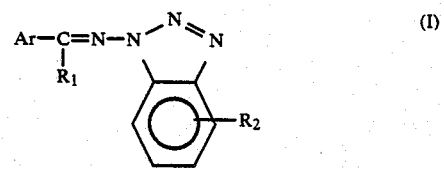
(I)

wherein Ar represents an aryl group, a heterocyclic group, a condensed polycyclic group, which may have a substituent, or a group represented by the formula

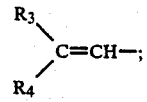

$R_1$, $R_2$ and $R_3$ independently represent any of hydrogen atom, an alkyl group, aralkyl group, or aryl group where the alkyl group, aralkyl group and aryl group may have a substituent; $R_4$ represents any of aryl group, heterocyclic group and condensed polycyclic group, which may have a substituent; and Ar and $R_1$ or $R_3$ and $R_4$ may combinedly form a cyclic ring.

These hydrazone compounds have excellent compatibility with binders and give a charge transportability. The photosensitive member obtained shows high sensitivity, good chargeability, resistivity for repeated use and stability.

BRIEF DESCRIPTION OF THE DRAWINGS

FIGS. 1, 4 and 5 show the structure of a photosensitive member of the dispersion type, which consists of an electroconductive substrate overlaid with a photosensitive layer; and FIGS. 2 and 3 show the structure of a photosensitive member of the function-separating type, wherein a charge-generating layer and a charge-transporting layer, forming separate layers, overlie an electroconductive substrate.

DETAILED DESCRIPTION OF THE INVENTION

Figure 1:
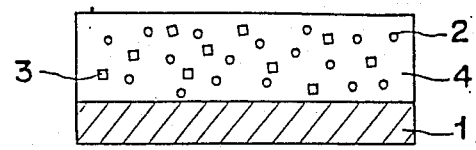
FIGS. 1 through 5 schematically show the photosensitive members of the present invention.

The present invention provides a photosensitive member for electrophotography, which contains a hydrazone compound having good compatibility with binders and good charge transporting ability, and whereby a high sensitivity, a good chargeability, minimized deterioration through fatigue accompanying repeated use, and stability of electrophotographic properties are all ensured.

The present invention has accomplished the above-mentioned object by introduction of a specific hydrazone compound.

A photosensitive member provided according to the present invention contains a specific hydrazone compound represented by the following formula as a charge transporting material.

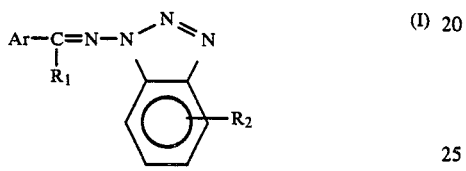
(I)

wherein Ar represents aryl group, heterocyclic group, condensed polycyclic group, which may have a substituent, or a group represented by the formula

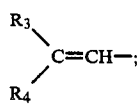

$R_1$, $R_2$ and $R_3$ independently represent any of hydrogen atom, an alkyl group, aralkyl group, or aryl group where the alkyl group, aralkyl group and aryl group may have a substituent; $R_4$ represents any of aryl group, heterocyclic group and condensed polycyclic group, which may have a substituent; and Ar and $R_1$ or $R_3$ and $R_4$ may combinedly form a cyclic ring.

In the preferable hydrazone compound of the present invention Ar is phenyl which may have a substituent such as alkyl (e.g. methyl, ethyl, propyl, butyl), alkoxyl (e.g. methoxy, ethoxy, propoxy), a di-substituted amino group such as dimethylamino, diethylamino, diphenylamino, dipropylamino, di(alkyl)phenylamino, di(alkyl)benzylamino group (the phenyl group may have the same or different and two or more substituent); a naphtyl group, anthryl, phenanthryl, pyrenyl, fluorenyl, which may have a substituent such as an alkyl group (e.g. methyl, ethyl, propyl), alkoxy group (e.g. methoxy, ethoxy, propoxy) and the like; phenetyl, styryl, cinnamyl, which may have a substituent such as a di-substituted amino group (e.g. dimethylamino, diethylamino, diphenylamino), an alkoxy group (e.g. methoxy, ethoxy), alkyl group (e.g. methyl, ethyl, propyl), phenyl group and the like; α-substituted styryl or cinnamyl group; heterocyclic group such as pyrrolyl, pyrrolinyl, pyrrolidinyl, indolyl, isoindolyl, quinolinyl, carbazolyl, acridinyl, phenoxazinyl, thiazolyl and the like, which may have a alkyl (e.g. methyl, ethyl) or phenyl subtituent on the nitrogen of the heterocyclic group.

Preferable $R_1$ of the enamine compound of the present invention includes hydrogen, a lower alkyl group such as methyl, ethyl, phenyl group, which may have substituents such as lower alkyl group (e.g. methyl, ethyl, propyl), lower alkoxy group (e.g. methoxy, ethoxy, propoxy), di-substituted amino group (e.g. dimethylamino, diethylamino, dipropylamino, diphenylamino, dibenzylamino, methylphenylamino) and the like. $R_1$ may form a cyclic ring together with Ar, for example, 9,9-fluorenyl group.

Preferable hydrazone compounds of the present invention, represented by said general formula (I) are shown below with formulas (1) through (32) but these are shown without restricting the embodiments of the invention.

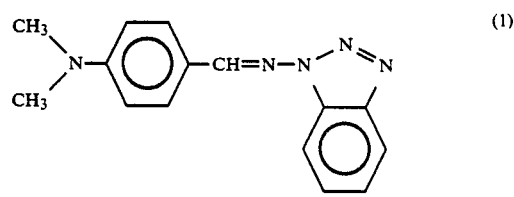
(1)

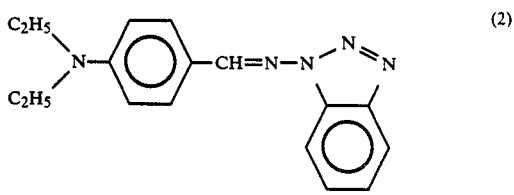
(2)

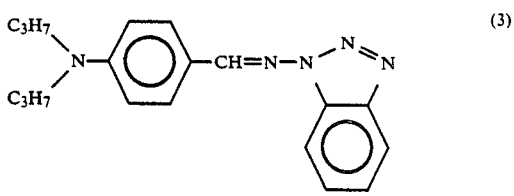
(3)

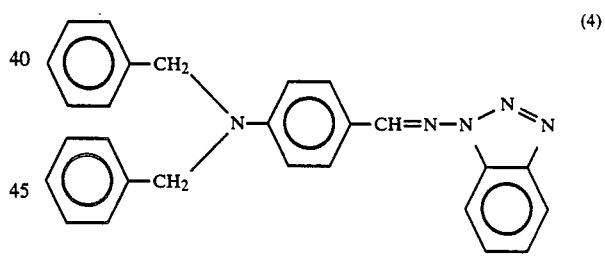
(4)

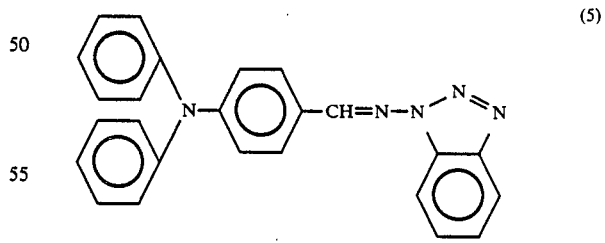
(5)

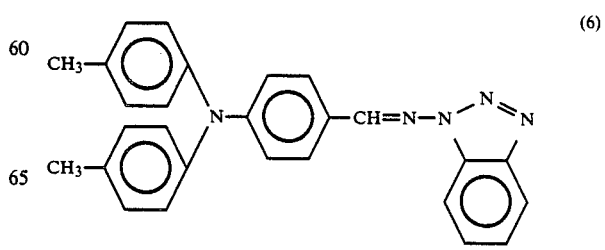
(6)

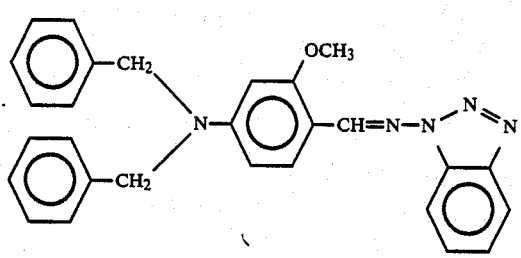
(7)
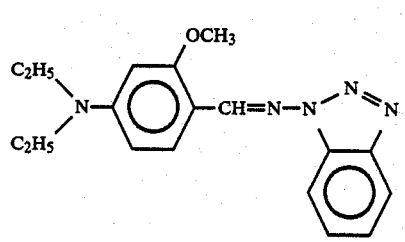
(8)
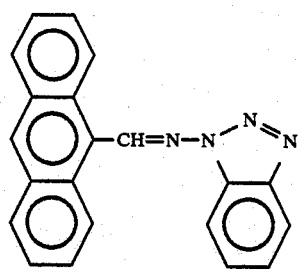
(9)
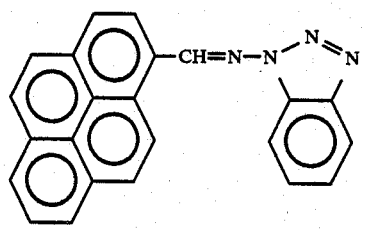
(10)
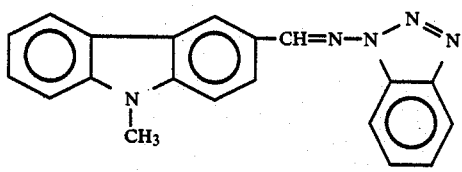
(11)
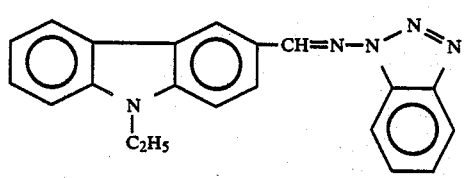
(12)
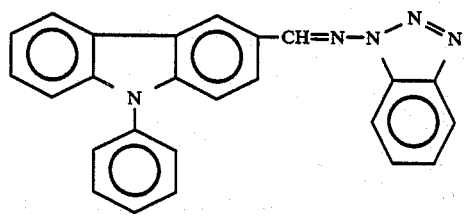
(13)
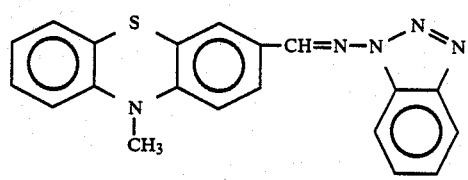
(14)
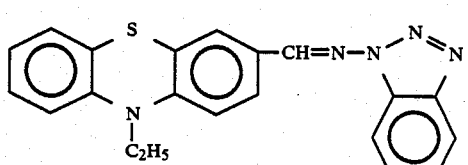
(15)
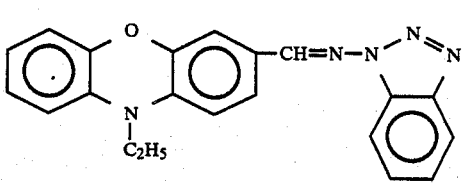
(16)
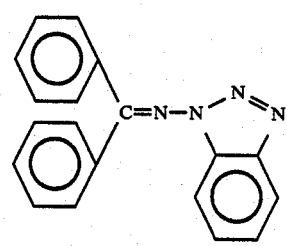
(17)
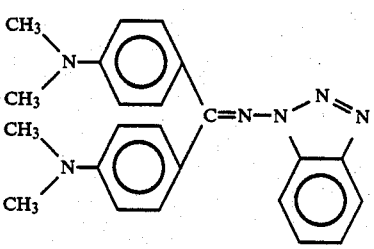
(18)
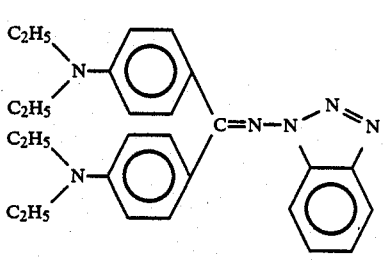
(19)
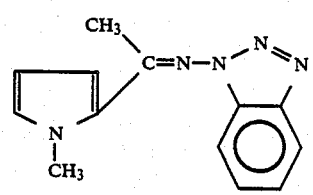
(20)

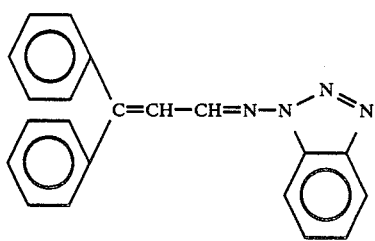 (21)
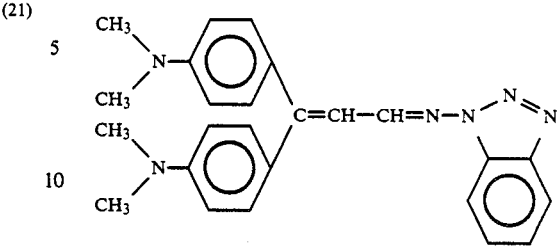 (27)
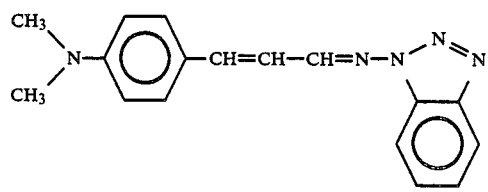 (22)
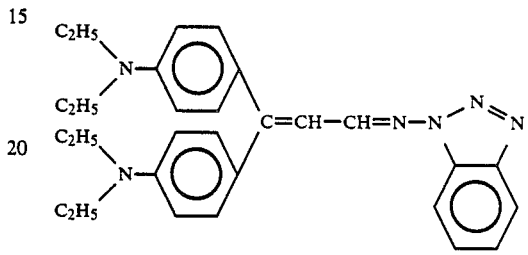 (28)
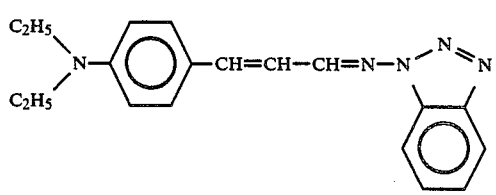 (23)
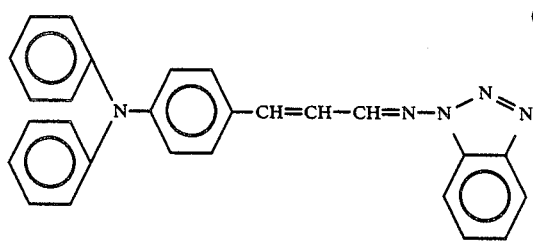 (24)
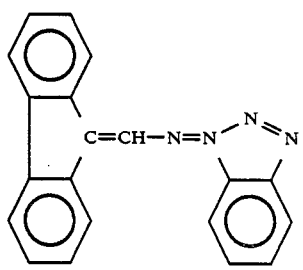 (29)
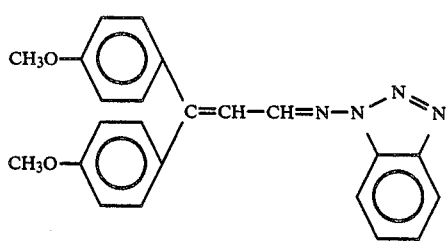 (25)
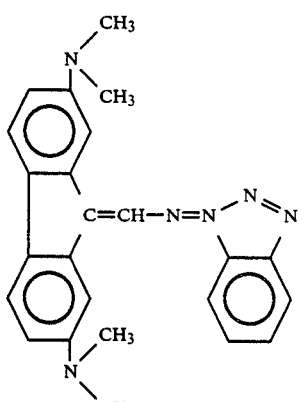 (30)
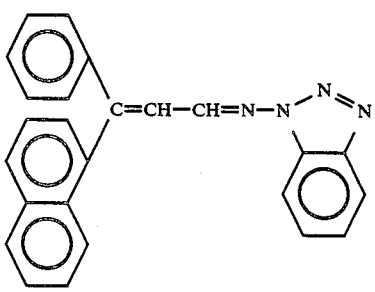 (26)
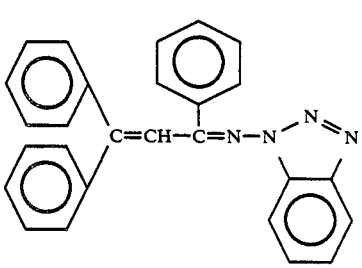 (31)

-continued

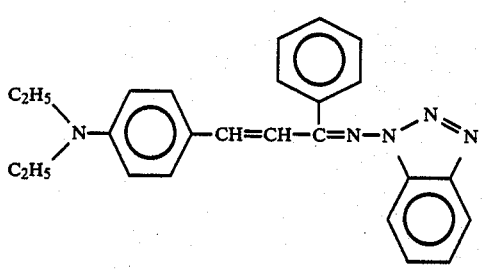

(32)

A hydrazone compound of the present invention can be synthesized by a publicly known method: for example, the amine compound represented by the following formula (II):

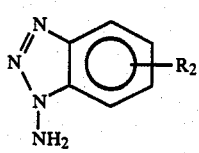

[II]

wherein $R_2$ is the same as above and the carbonyl compound represented by the following formula (III):

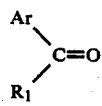

[III]

wherein Ar and $R_1$ are the same as the above are subjected by a condensation reaction involving reflux by heating in a solvent of, any of, or a mixture of, an alcohol such as methanol or ethanol, or tetrahydrofuran, n,n-dimethylformamide, acetic acid, or the like and in the presence of, as condensation agent, a tertiary amine such as pyridine or triethylamine, or an inorganic acid, or an inorganic acid, or an organic acid such as acetic acid. In other words, a hydrazone compound represented by the general formula (I) can be obtained by a condensation reaction of a ketone compound represented by the general formula (III) with a hydrazine compound represented by the general formula (II).

In FIG. 1 through FIG. 5, there are schematically shown photosensitive members based on hydrazone compounds as embodiments of the present invention.

FIG. 1 shows a photosensitive member wherein a hydrazone compound of the invention is used for the charge transporting material; a photosensitive layer (4) which consists of a charge transporting material (2) and a photoconductive material (3) both incorporated in a binder is formed on a substrate (1).

Figure 2:
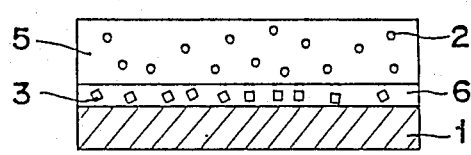

FIG. 2 shows a photosensitive member of the function-separating type, whose photosensitive layer consists of a charge-generating layer (6) and a charge-transporting layer (5). The charge-transporting layer (5) is formed on the surface of the charge-generating layer (6). A hydrazone compound of the present invention is incorporated in the charge-transporting layer (5).

Figure 3:
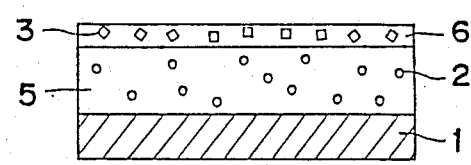

FIG. 3 is also a photosensitive layer of the function-separating type, having a charge-generating layer (6) and a charge-transporting layer (5), but, unlike FIG. 2, the charge-generating layer (6) is formed on the surface of the charge-transporting layer (5).

Figure 4:
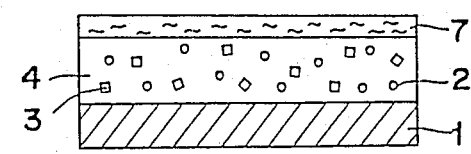

FIG. 4 is a photosensitive member which consists of the same photosensitive member as FIG. 1 whose surface is covered with a surface-protective layer (7). The photosensitive layer (4) can be altered to the function-separating type by separating it into a charge-generating layer (6) and a charge-transporting layer (5).

Figure 5:
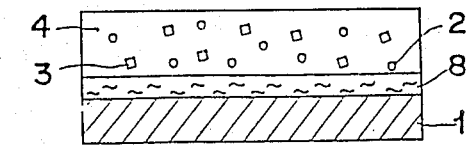

FIG. 5 shows an example of a photosensitive member wherein there is an intermediate layer (8) between the substrate (1) and the photosensitive layer (4). An intermediate layer (8) can be formed for the purpose of improving adhesivity, coating property, and charge injecting property from the substrate into the photoconductive layer as well as protecting the substrate. The materials suitable for the intermediate layer are polyimide resin, polyester resin, polyvinyl butyral resin, casein, etc. The photosensitive layer of this type of photosensitive member can also be altered to the function-separating type.

In the practice of this invention a photosensitive member is produced by dissolving or dispersing a hydrazone compound together with a binder in a suitable solvent, with addition thereto of a photoconductive material together with an electron-attractive compound, or a sensitizing dye, or a pigment, where necessary, and by applying a coating preparation thereby obtained to an electroconductive substrate, followed by drying, so as to form a photosensitive layer with a film thickness of ordinarily 5–30 μm, preferably 6–20 μm.

A photosensitive member of the function-separating type, which consists of an electroconductive substrate overlaid with a charge-generating layer and a charge-transporting layer as shown in FIG. 2, is produced by; first applying a photoconductive material to an electroconductive substrate by vacuum deposition or by coating with a coating preparation obtained by dissolving the photoconductive material in a suitable solvent, or by dispersing it in a solution of a binder resin where necessary, followed by drying, so as to form a charge-generating layer, and, second, by overlaying the charge-generating layer with a coating prepared by dissolving a hydrazone compound and a binder in a suitable solvent, followed by drying, so as to form a charge-transporting layer. The charge-generating layer thus produced should have a thickness of 4 μm or less, preferably 2 μm or less, and the charge-transporting layer a thickness in the range 3–30 μm, preferably 5–20 μm. It is suitable for the hydrazone compound contained in the charge-transporting layer to have a proportion of 0.02–2 parts by weight, preferably 0.03–1.3 parts by weight, with one part by weight of the binder. The charge-transporting material permits the use of additional charge-transporting materials in combination. There is no need to use a binder when the charge-transporting material is a high-polymer which is capable of serving as a binder itself. A photosensitive member embodying this invention can be formed by overlaying an electroconductive substrate with a charge-transporting layer and thereupon with a charge-generating layer in the same manner as the photosensitive member in FIG. 3.

A photosensitive member of the dispersion type, which consists of an electroconductive substrate overlaid with a photosensitive layer in the same manner as the photosensitive member in FIG. 1, is produced by dispersing fine particles of a photoconductive material in a solution of a hydrazone compound and a resin and by coating the electroconductive substrate with a coating material thus prepared, followed by drying, so as to form a photosensitive layer. The photosensitive layer should have a thickness in the range 3-30 μm, preferably 5-20 μm. The quantity of the photoconductive material in the photosensitive layer should have a proportion of 0.01-2 parts by weight, preferably 0.05-1 parts by weight, against one part by weight of the resin. The sensitivity is poor if the photoconductive material is used in insufficient quantities, whereas chargeability is poor and mechanical strength of the photosensitive layer is inadequate if used to excess. It is suitable for the hydrazone compound to be used in a quantity in the range 0.01-2 parts by weight, preferably 0.02-1.2 parts by weight, against one part by weight of the resin. A photoconductive material of a high-polymer, such as polyvinyl carbazole, which is capable of serving as a binder, can be used in combination. Other charge-transporting materials can also be used in combination.

Applicable as a photoconductive material for the production of a photosensitive member of the present invention are, among organic substances, bisazo pigment, triarylmethane dye, thiazine dye, oxazine dye, xanthene dye, cyanine colorant, styryl colorant, pyrylium dye, azo pigment, quinacridone pigment, indigo pigment, perylene pigment, polycyclic quinone pigment, bisbenzimidazole pigment, indanthrone pigment, squalilium pigment, phthalocyanine pigment, etc., and, among inorganic substances, selenium, selenium-terrulium, selenium-arsenic, cadmium sulfide, amorphous silicon, etc. Besides these named, any material which absorbs light and generates a charge carrier with a high efficiency can be used.

Applicable as a binder in the practice of this invention are any of thermoplastic resins and thermosetting resins which are publicly known to be electrically insulative and any of photocuring resins and photoconductive resins.

Some examples of suitable binders are, among thermoplastic resins, saturated polyester, polyamide, acrylic, ethylene-vinyl acetate copolymer, ion cross-linked olefin copolymer (ionomer), styrene-butadiene block copolymer, polyacrylate, polycarbonate, vinyl chloride-vinyl acetate copolymer, cellulose ester, polyimide, styrol, etc., and, among thermosetting resins, epoxy, urethane, silicone, phenolic, melamine, xylene, alkyd, thermosetting acrylic, etc., and photocuring resins, and photoconductive resins, such as poly-N-vinyl carbazole, polyvinyl pyrene, polyvinyl anthracene, etc., all named without any significance of restricting the use to them. Any of these resins can be used singly or in combination with other resins.

It is desirable for any of these electrically insulative resins to have a volume resistance of $1 \times 10^{12}$ Ω.cm or more when measured singly. Most preferable of all are polyester, polycarbonate and acrylic.

A photosensitive member of the present invention permits, in combination with the binder, the use of a plasticizer, such as halogenated paraffin, polybiphenyl chloride, dimethyl naphthalene, dibutyl phthalate or O-terphenyl, the use of an electron-attractive sensitizer, such as chloranyl, tetracyanoethylene, 2,4,7-trinitro-9-fluorenone, 5,6-dicyanobenzoquinone, tetracyanoquinodimethane, tetrachlorphthalic anhydride, or 3,5-dinitrobenzoic acid, and the use of a sensitizer, such as methyl violet, rhodamine B, cyanine dye, pyrylium salt, and thiapyrylium salt.

A photosensitive member thus formed may have an intermediate layer (adhesion layer) (8), or a surface-protective layer (7) as shown by FIGS. 4 and 5, as occasion demands.

A photosensitive member of the present invention shows, by virtue of a hydrazone compound contained therein as explained in the foregoing description, an excellent charge-transporting ability, stable initial surface potential, and reduced dark reduction rate which involves no practical problems, and a satisfactory chargeability, and furthermore shows, by virtue of the improvement in charge-transporting ability, less traps for the carrier, a high sensitivity, and reduced deterioration through fatigue, even after repeated use.

EXAMPLE 1

One part by weight of chlorodiane blue represented by the following general formula (A)

General formula

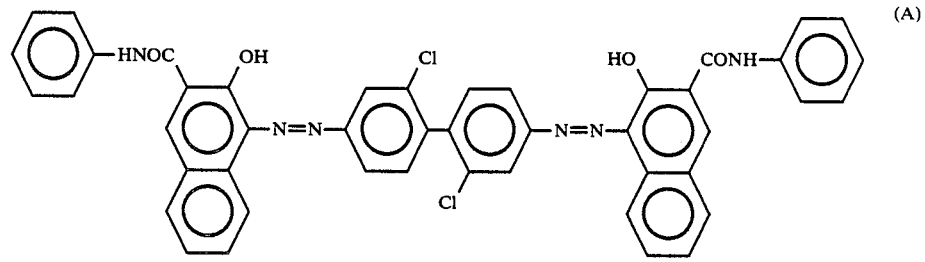

(A)

and one part by weight of polyester resin ("Vylon 200" made by Toyobo) and 50 parts by weight of tetrahydrofuran were taken in a ball-mill pot for dispersion for 24 hours and a photosensitive coating liquor was obtained. An aluminum substrate was coated with this liquor, and after drying, a charge-generating layer with a thickness of 1 μm was formed thereon. This charge-generating layer was coated with a liquid coating prepared by dissolving 10 parts by weight of the hydrazone compound (2) and 10 parts by weight of polycarbonate resin ("Panlite K-1300" made by Teijin Chemicals) in 100 parts by weight of tetrahydrofuran, and after drying, a charge-transporting layer with a thickness of 15 μm was formed.

The photosensitive member thus formed was tested with an electrophotographical copying machine available on the market (made by Minolta Camera, EP450Z) to determine, for a corona charge at $-6.0$ KV, the initial potential Vo(v), exposure $E_{\frac{1}{2}}$ (lux.sec) required to reduce the initial potential to a half, and the reduction rate $DDR_5(\%)$ of the initial potential after being left in the dark for five seconds.

EXAMPLES 2-5

Photosensitive members which were structurally the same as in Example 1 were made in the same manner, except that the hydrazone compounds (3), (4), (5) and (6) were used instead of the hydrazone compounds (2).

The photosensitive members thus formed were tested in the same manner as in Example 1 to determine $V_o$, $E_{\frac{1}{2}}$ and $DDR_5$.

EXAMPLE 6

Two parts by weight of disazo pigments represented by the following general formula (B)

General formula:

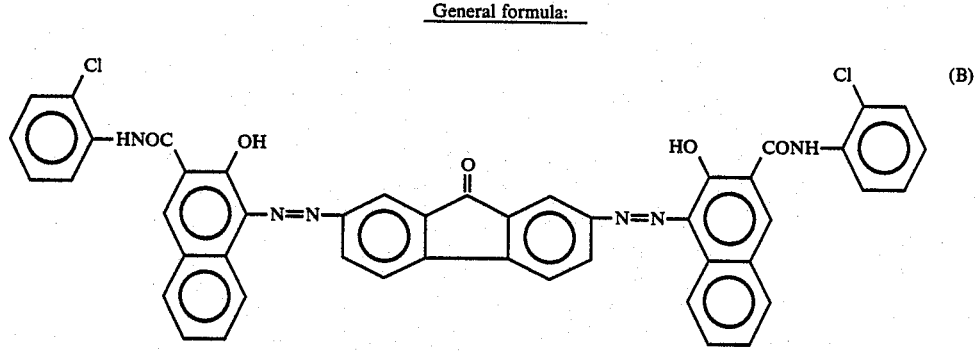

and one part by weight of polyester resin ("Vylon 200" made by Toyobo) and 100 parts by weight of methyl ethyl ketone were taken in a ball-mill pot and, after dispersion for 24 hours, a coating preparation of a photosensitive substance was obtained. An aluminium substrate was coated with said coating preparation, and, after drying, a charge-generating layer with a thickness of 1 microns was formed thereon.

The charge-generating layer thus formed was coated with a liquid coating prepared by dissolving 10 parts by weight of the hydrazone compound (7) in the foregoing description and 10 parts by weight of polycarbonate resin ("Panlyte K-1300" available from Teijin Kasei K.K.) in a solvent of 100 parts by weight of tetrahydrofuran, and, after drying, a charge-transporting layer with a thickness of 15 $\mu$m was formed.

The photosensitive member thus obtained was tested in the same manner as in Example 1 to determine $V_o$, $E_{\frac{1}{2}}$ and $DDR_5$.

EXAMPLES 7-9

A photosensitive member which was structurally the same as in Example 6 was formed in the same manner, except that the hydrazone compounds (8), (12) and (15) were used instead of the hydrazone compound (7).

The photosensitive member thus obtained was tested in the same manner as in Example 1 to determine $V_o$, $E_{\frac{1}{2}}$ and $DDR_5$.

EXAMPLE 10

50 parts by weight of copper phthalocyanine and 0.2 parts by weight of tetranitro-copper-phthalocyanine were dissolved in a 500 parts by weight of concentrated 98% sulfuric acid with a good stirring, and the solution was poured into 5,000 parts by weight of water so that a composition of photoconductive material composed of copper phthalocyanine and tetranitro-copper-phthalocyanine was separated therein. After filtering, said composition was rinsed with water and dried at 120° C. under reduced pressure.

10 parts by weight of the photoconductive composition thus obtained, 22.5 parts by weight of thermosetting acrylic resin ("Acrydic A405" made by Dainippon Ink & Chemicals), 7.5 parts by weight of a melamine resin ("Super Beckamine J820" made by Dainippon Ink & Chemicals), and 10 parts by weight of the hydrazone compound (19), together with a 100 parts by weight of a mixed solvent composed of methyl ethyl ketone and xylene in equal quantities, were all taken in a ball-mill pot to form, by dispersion for 48 hours, a liquid coating of photoconductive material. The liquid coating thus obtained was applied to an aluminum substrate, and, after drying, a photosensitive member overlaid with a photosensitive layer with a thickness of approximately 15 $\mu$m was formed.

The photosensitive member thus obtained was tested to determine $V_o$, $E_{\frac{1}{2}}$ and $DDR_5$ in the same manner as in Example 1, except that the corona charge was +6 KV.

EXAMPLES 11 AND 12

Photosensitive members which were structurally the same as in Example 10 were formed in the same manner, except that the hydrazone compound (25) and (28) were used instead of the hydrazone compound (19).

The photosensitive members thus obtained were tested in the same manner as in Example 10 to determine $V_o$, $E_{\frac{1}{2}}$ and $DDR_5$.

Comparative Examples 1-4

Photosensitive members which were structurally the same as in Example 10 were formed in the same manner, except that the following hydrazone compounds (A), (B), (C) and (D) were used instead of the hydrazone compound (19).

The photosensitive members thus obtained were tested in the same manner as in Example 10 to determine $V_0$, $E_{\frac{1}{2}}$ and $DDR_5$.

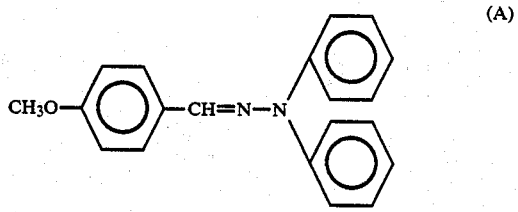

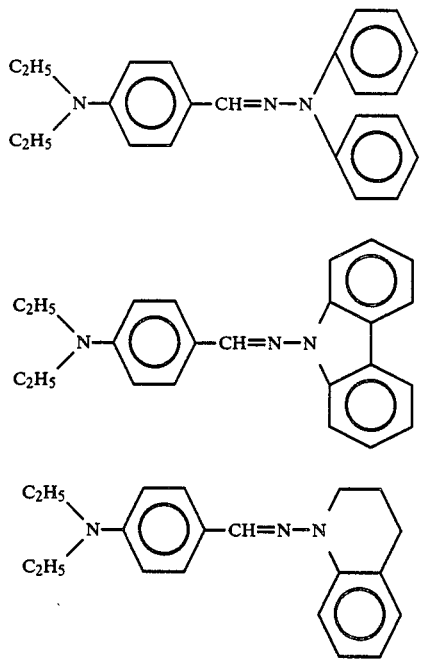

TABLE 1

| | $V_0$ (V) | $E_{2/1}$ (lux.sec) | $DDR_5$ (%) |
|---|---|---|---|
| Example 1 | −680 | 3.6 | 3.0 |
| Example 2 | −670 | 3.5 | 5.0 |
| Example 3 | −680 | 3.2 | 3.0 |
| Example 4 | −680 | 2.8 | 4.0 |
| Example 5 | −670 | 2.9 | 5.5 |
| Example 6 | −660 | 2.5 | 5.0 |
| Example 7 | −650 | 2.7 | 6.5 |
| Example 8 | +660 | 2.8 | 4.0 |
| Example 9 | +670 | 3.0 | 5.0 |
| Example 10 | +650 | 2.5 | 12.0 |
| Example 11 | +650 | 2.3 | 11.0 |
| Example 12 | +640 | 2.2 | 13.0 |
| Comparative Example 1 | 640 | 8.0 | 11.0 |
| Comparative Example 2 | 620 | 3.4 | 14.5 |
| Comparative Example 3 | 640 | 5.1 | 12.0 |
| Comparative Example 4 | 630 | 3.5 | 13.0 |

As will be understood from Table 1, a photosensitive member embodying the present invention has a Vo of 600 V or more, a small $DDR_5$, sufficient to be used as a photosensitive member, and shows an excellent chargeability and a satisfactory sensitivity. As apparent from $E_{\frac{1}{2}}$ being 2.2–3.6 lux.sec the obtained photosensitive member has an excellent sensitivity. Also in a copying test under repeated positively polarized charge with a copying machine, to which the photosensitive members of Examples 10–12 were subjected, 10,000 copies were obtained with clear images excellent in gradation effect both initially and finally, and without change in sensitivity. Every property of the photosensitive member thus obtained is stable even after repeated use.

What is claimed is:

1. A photosensitive member for electrophotography, which contains an specific hydrazone compound represented by the following formula as a charge transporting material;

$$\underset{R_1}{Ar-C=N-N} \diagup \overset{N}{\underset{N}{\diagdown}} \diagdown R_2 \qquad (I)$$

wherein Ar is an aryl group, heterocyclic group, condensed polycyclic group, which may have a substituent, or a group represented by the formula $$\underset{R_4}{\overset{R_3}{\diagdown}} C=CH-;$$

$R_1$, $R_2$ and $R_3$ independently is any of hydrogen atom, an alkyl group, aralkyl group, or aryl group where the alkyl group, aralkyl group and aryl group may have a substituent; $R_4$ is any of aryl group, heterocyclic group and condensed polycyclic group, which may have a substituent; and Ar and $R_1$ or $R_3$ and $R_4$ may combinedly form cyclic ring and further comprising a photoconductive material.

2. The photosensitive member of claim 1, wherein Ar is phenyl which may have as a substituent methyl, ethyl, propyl, methoxy, ethoxy, propoxy, dimethylamino, diethylamino, diphenylamino, dipropylamino, di(alkyl)phenylamino, di(alkyl)benzylamino; a di-substituted amino alkoxy phenyl group; a naphtyl group, anthryl, phenanthryl, pyrenyl, fluorenyl, which may have as a substituent such as methyl, ethyl propyl, methoxy, ethoxy, propoxy; phenetyl, styryl, cinnamyl, which may have as a substituent a dimethylamino, diethylamino, diphenylamino, an methoxy, ethoxy, ethoxy, methyl, ethyl, propyl, phenyl group; alpha-substituted styryl or cinnamyl group; pyrrolyl, pyrrolinyl, pyrrolidinyl, indolyl, isoindolyl, quinolinyl, carbazolyl, acridinyl, phenoxazinyl, thiazolyl and the like, which may have a methyl, ethyl or phenyl substituent on the nitrogen of the heterocyclic group.

3. The photosensitive member of claim 1, wherein $R_1$ of the hydrazone compound is hydrogen atom, methyl, ethyl, phenyl group which may have as a substituent a methyl, ethyl, propyl, methoxy, ethoxy, propoxy, dimethylamino, diethylamino, dipropylamino, diphenylamino; or a group forming a cyclic ring together with Ar.

4. The photosensitive member of claim 1, which consists essentially of a photosensitive layer comprising the hydrazone compounds dissolved or dispersed together with a photoconductive material in a binder on an electroconductive substrate.

5. The photosensitive member of claim 1, which consists essentially of a charge generating layer, a charge transporting layer and an electroconductive substrate wherein the charge transporting layer contains the hydrazone compound dissolved or dispersed in a binder.

6. The photosensitive member of claim 5, in which the hydrazone compounds are contained at a proportion of 0.02–2 parts by weight against one part by weight of the binder.

7. The photosensitive member of claim 5, in which the thickness of the charge generating layer is about 3–30 μm, and the thickness of the charge transporting layer is not more than about 4 μm.

* * * * *